United States Patent
Simpson

[11] Patent Number: 5,867,687
[45] Date of Patent: Feb. 2, 1999

[54] MICROPROCESSOR SYSTEM FOR HANDLING MULTIPLE PRIORITY LEVELS INTERRUPT REQUESTS TO PROCESSOR AND INTERRUPT PROCESS IDENTIFIERS

[75] Inventor: Robert John Simpson, Bristol, United Kingdom

[73] Assignee: SGS-Thomson Microelectronics Limited, Almondsbury Bristol, United Kingdom

[21] Appl. No.: 642,332

[22] Filed: May 3, 1996

[30] Foreign Application Priority Data

May 12, 1995 [GB] United Kingdom ............... 9509626

[51] Int. Cl.[6] ..................... G06F 13/00
[52] U.S. Cl. .............. 395/737; 395/733; 395/741; 395/738
[58] Field of Search ................ 395/737, 725, 395/738, 275, 733, 741; 340/172.5; 364/200

[56] References Cited

U.S. PATENT DOCUMENTS

| | | | |
|---|---|---|---|
| 526,109 | 11/1894 | Cabdambi et al. | 395/725 |
| 3,905,025 | 9/1975 | Davis et al. | 340/172.5 |
| 4,020,471 | 4/1977 | Woods et al. | 340/172.5 |
| 4,023,143 | 5/1977 | Braunstein | 340/172.5 |
| 4,799,148 | 1/1989 | Nishioka | 364/200 |
| 5,077,662 | 12/1991 | Hutson | 395/725 |
| 5,083,261 | 1/1992 | Wilkie | 395/725 |
| 5,133,056 | 7/1992 | Miyamori | 395/275 |
| 5,257,357 | 10/1993 | Yishay et al. | 395/725 |
| 5,280,618 | 1/1994 | Takagi | 395/725 |
| 5,581,771 | 12/1996 | Osakabe | 395/738 |
| 5,634,112 | 5/1997 | Thome et al. | 395/481 |

FOREIGN PATENT DOCUMENTS

| | | | |
|---|---|---|---|
| A-0 469 543 | 2/1992 | European Pat. Off. | G06F 13/26 |
| A-0 581 480 | 2/1994 | European Pat. Off. | G06F 13/24 |
| A-0 652 541 | 5/1995 | European Pat. Off. | G06F 9/46 |

OTHER PUBLICATIONS

European Search Report from European Patent Application 96302950, dated Sep. 5, 1996.

Standard Search Report issued by the European Patent Office dated Sep. 4, 1995.

Computer Design, vol. 17, No. 9, Sep. 1978, Littleton, MA, US, pp. 101–110, R. Jaswa "Designing Interrupt Structures for Multiprocessor Systems".

Elektronik, vol. 28, No. 10, May 1979, Munchen DE, pp. 73–80, H. Waltring "der Interrupt Controller–ein Baustein, der für Ordnung Sorgt".

*Primary Examiner*—Meng-Ai T. An
*Assistant Examiner*—Eric S. Thlang
*Attorney, Agent, or Firm*—Wolf, Greenfield & Sacks, P.C.

[57] ABSTRACT

There is disclosed control circuitry for, and a method of controlling, multiple priority level interrupt request to a microprocessor in which output circuitry for outputting an interrupt identifier is operable only in response to an interrupt signal having a higher priority status than any currently executing interrupt process, and a microprocessor system and method of controlling a microprocessor system, incorporating such circuitry.

24 Claims, 3 Drawing Sheets

& 1

MICROPROCESSOR SYSTEM FOR HANDLING MULTIPLE PRIORITY LEVELS INTERRUPT REQUESTS TO PROCESSOR AND INTERRUPT PROCESS IDENTIFIERS

FIELD OF THE INVENTION

The present invention relates to control of multiple priority level interrupt requests to a CPU of a microprocessor.

BACKGROUND OF THE INVENTION

An interrupt is any action which causes the temporary cessation of execution by a processor of a particular process so that the processor can execute an interrupt process. Such action is typically initiated in processor circuits by peripheral devices requesting the processor to interrupt execution of a main process to execute an interrupt process associated with that particular peripheral device.

Known processors have been designed with a capacity to support a fixed number of interrupt priority levels. It may be necessary for a processor to support more than one interrupt since different interrupt requests require different interrupt processes. Not only do processors need to be able to support multiple interrupt requests, but they also need to be able to prioritise such requests should they occur simultaneously.

However, the number of interrupt priority levels which can be supported may be restricted by the processor. Typically a processor may support only two interrupt priority levels. Although processors may be adapted to support additional levels of interrupt, such adaptation is complex and it may be necessary to modify the instruction set of the processor and also to provide additional registers.

SUMMARY OF THE INVENTION

It is therefore an object of the present invention to provide an apparatus and a method for handling multiple priority level interrupt requests to a processor while reducing the problem of alteration to the processor itself.

According to one aspect of the present invention there is provided control circuitry for multiple priority level interrupt requests to a microprocessor comprising input circuitry having a plurality of parallel inputs for receiving respective interrupt signals and including storage circuitry to provide an indication of which inputs have received an interrupt signal and to retain said indication until an interrupt process associated with the respective interrupt signal has been completed, identifer storage circuitry for storing a plurality of interrupt identifiers, each interrupt identifier identifying an interrupt process for execution by the processor and corresponding to a respective one of said interrupt signals, arbiter circuitry connected to said storage circuitry for determining a priority status for each interrupt signal for which an indication is held by said storage circuitry and selecting the one interrupt signal with the highest priority status and output circuitry, operable to output an interrupt request signal only in response to an interrupt signal having a higher priority status than any currently executing interrupt process, and responsive to said arbiter circuitry for outputting a selected one of said plurality of interrupt identifiers associated with said one interrupt signal.

Thus there is provided circuitry for controlling interrupt requests to a processor which may be used for a large number of interrupt levels to be supported without modification to the processor. Preferably said output circuitry further outputs an interrupt request signal to the microprocessor.

It is also advantageous that interrupt processes can be interrupted by higher priority interrupt processes. Thus preferably said storage circuitry includes a first store for each input to indicate that an interrupt signal has been received for that input, and a second store for each input to indicate that the interrupt process of that input is currently executing.

According to a second aspect of the present invention there is provided a microprocessor system comprising a processor and a memory and including control circuitry for multiple priority level interrupt requests to the microprocessor, said control circuitry comprising input circuitry having a plurality of parallel inputs for receiving respective interrupt signals and including input storage circuitry to provide an indication of which inputs have received an interrupt signal and to retain said indication until an interrupt process associated with the respective interrupt signal has been completed, identifer storage circuitry for storing a plurality of interrupt identifiers, each interrupt identifier identifying an interrupt process for execution by the processor and corresponding to a respective one of said interrupt signals, arbiter circuitry connected to said storage circuitry for determining a priority status for each interrupt signal for which an indication is held by said storage circuitry and selecting the one interrupt signal with the highest priority status and output circuitry, operable only in response to an interrupt signal having a higher priority status than any currently executing interrupt process, and responsive to said arbiter circuitry for outputting a selected one of said plurality of interrupt identifiers associated with said one interrupt signal responsive to said arbiter circuitry for outputting a selected one of said plurality of interrupt identifiers associated with said one interrupt signal.

Preferably the memory has a plurality of allocated address spaces each associated with a respective one of said interrupt processes, wherein during execution of one of the interrupt processes parameters associated with an interrupted process are stored in one of the allocated address spaces. Thus additional priority levels may be added to the microprocessor system without alteration of the processor.

Preferably the processor, the memory and the control circuitry are formed on a single integrated circuit device.

According to a third aspect of the present invention there is provided a method of controlling multiple priority level interrupt requests to a microprocessor comprising the steps of receiving at least one of a plurality of parallel interrupt signals, storing an indication of which interrupt signals have been received, retaining said indication until an interrupt process associated with the respective interrupt signal has been completed, storing a plurality of interrupt identifiers each interrupt identifier identifying an interrupt process for execution by the processor and corresponding to a respective one of said interrupt signals, determining a priority status for each interrupt signal for which an indication is stored, selecting the one interrupt signal with the highest priority status and outputting, in dependence on an interrupt signal having a higher priority status than any currently executing process, a selected one of said plurality of interrupt identifiers associated with said one interrupt signal.

Preferably the method further comprises the step of storing an indication of whether the interrupt process associated with an interrupt signal which has been received is currently executing.

Preferably the method further comprises the step of outputting an interrupt request signal to the microprocessor.

According to a fourth aspect of the present invention there is provided a method of controlling multiple priority level interrupt requests in a microprocessor system including a memory and a processor, said method comprising the steps of receiving at least one of a plurality of parallel interrupt signals, storing an indication of which interrupt signals have been received, retaining said indication until an interrupt process associated with the respective interrupt signal has been completed, storing a plurality of interrupt identifiers each interrupt identifier identifying an interrupt process for execution by the processor and corresponding to a respective one of said interrupt signals, determining a priority status for each interrupt signal for which an indication is stored, selecting the one interrupt signal with the highest priority status and outputting, in dependence on an interrupt signal having a higher priority status than any currently executing process, a selected one of said plurality of interrupt identifiers associated with said one interrupt signal, a selected one of said plurality of interrupt identifiers associated with said one interrupt signal.

Preferably the method further comprises the steps of allocating in the memory at least one address space for association with a respective interrupt process up to completion of the interrupt process, and storing in said at least one address space during execution of the interrupt process a parameter associated with a previous process which was interrupted by the interrupt process.

Preferably each executing interrupt process has allocated in memory a respective plurality of address spaces, each plurality of spaces holding parameters of a process which was interrupted by the respective interrupt process.

Preferably the interrupt identifiers are addresses of said memory.

An embodiment of the invention will now be described by way of example with reference to the accompanying drawings.

DESCRIPTION OF THE PREFERRED EMBODIMENT

Figure 1:
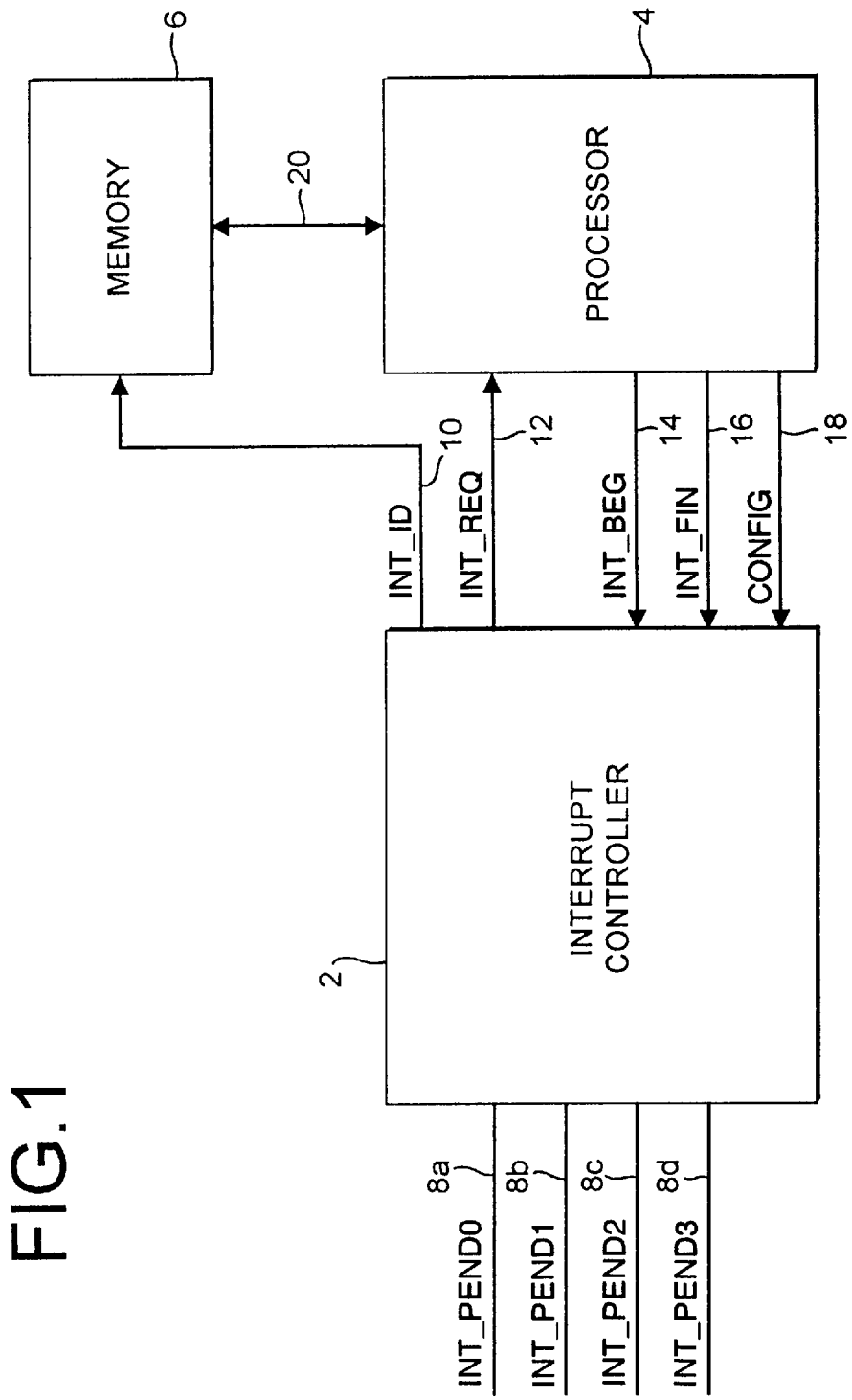
FIG. 1 illustrates schematically an implementation of an interrupt controller according to a preferred embodiment of the present invention.

FIG. 1 illustrates an implementation of an interrupt controller 2 according to a preferred embodiment of the present invention in a circuit also including a microprocessor 4 and a memory 6.

The interrupt controller 2 receives in parallel four interrupt signals INT_PEND0 to INT_PEND3 on lines 8a to 8d. The interrupt controller also receives a signal INT_BEG on line 14 indicating that the processor has begun an interrupt process, a signal INT_FIN on line 16 indicating that the processor has finished an interrupt process, and a set of signals CONFIG on line 18 which are used to configure the interrupt controller. The interrupt controller outputs an interrupt request signal INT_REQ on line 12 and an interrupt identification signal INT_ID on line 10. The processor 4 receives the signal INT_REQ from the interrupt controller and outputs the signals INT_BEG, INT_FIN and CONFIG to the interrupt controller. The memory 6 receives the signal INT_ID from the interrupt controller. A set of control signals CONTROL on line 20 are provided between the processor 4 and the memory 6 to enable the processor 4 to control the memory 6.

The four interrupt signals INT_END0 to INT_PEND3 each originate from a dedicated interrupt source. When a particular interrupt source requires the processor to execute an interrupt process associated therewith, the interrupt source sets its associated interrupt signal so as to inform the interrupt controller that it requires service from the processor. The interrupt controller stores a plurality of interrupt identifers, in this example four interrupt identifiers, which identify an interrupt associated with a particular interrupt source. The number of interrupt identifers stored by the interrupt controller corresponds to the number of interrupt signals received by the interrupt controller. It will become apparent from the following description that the interrupt controller could be adapted to receive in parallel any number of interrupt signals from any number of interrupt sources, and thus store any number of interrupt identifiers for supporting any number of interrupt processes.

Prior to operation of the interrupt controller 2 it is configured by the processor 4 using the signal CONFIG. The processor loads into the interrupt controller each interrupt identifier associated with each interrupt process. The interrupt identifier will be a unique "tag" such as an address associated with a particular interrupt process which the processor can use to locate and execute the interupt process as will be described in detail hereinbelow. The signal CONFIG from the processor may also be used to determine the priority level to be associated with each interrupt process and thus to be associated with each of the interrupt signals INT_PEND0 to INT_PEND3.

In response to one of the interrupt signals INT_PEND0 to INT_PEND3 being set the interrupt controller 2 sets the interrupt request signal INT_REQ to request the processor 4 to service an interrupt. At the same time the interrrupt controller outputs as the interrupt identification signal INT_ID the interrupt identifier associated with one of the interrupt signals INT_PEND0 to INT_PEND3 which has been set. In response to the interrupt request, the processor interrupts its current process and commences execution of the interrupt process associated with the interrupt identification signal INT_ID.

In a different embodiment of the invention, however, the interrupt identification signal INT_ID may also form the interrupt request signal to the processor, such an embodiment dispensing with the signal INT_REQ. In such an embodiment the processor may, for example, recognise an interrupt request by identifying a valid interrupt identification signal on line 10.

As will be described in detail hereinbelow, on interrupting a current process being performed by the processor to perform an interrupt process, it is necessary to store information associated with the interrupted process so that after executing the interrupt process the processor can return to, and continue executing, the interrupted process.

On commencing execution of the interrupt process the processor sets the signal INT_BEG so as to inform the interrupt controller that the interrupt is being serviced as requested. The interrupt controller is then aware that the particular interrupt which it had requested to be executed is being executed. Upon completion of execution of the interrupt process the processor sets the signal INT_FIN so that the interrupt controller is aware that the processor has finished execution of the interrupt and has returned to executing the interrupted process.

As each of the interrupt signals INT_PEND0 to INT_PEND3 is derived from a dedicated interrupt source, any one or all of the interrupt signals may be set simultaneously. The interrupt controller is therefore provided with arbiter circuitry which allocates a predetermined priority to each of the interrupt signals INT_PEND0 to INT_PEND3 and thus to each of the interrupt sources. The interrupt controller in the example of FIG. 1 is a four priority level interrupt controller, but the interrupt controller could be expanded to handle any number of priority levels. Thus in the event of more than one of the interrupt signals INT_PEND0 to INT_PEND3 simultaneously being set, the interrupt controller will output as the interrupt identification signal INT_ID that interrupt identifier associated with one of the interrupt signals which have been set having the highest priority. After execution of that interrupt the interrupt controller will again request the processor to interrupt its process to perform the next highest priority interrupt associated with one of the interrupt signals which has been set having the next highest priority.

As will be described in further detail hereinbelow if, whilst the processor is executing an interrupt process, an interrupt signal associated with an interrupt having a higher priority is set, then the interrupt controller will request the processor to interrupt that interrupt process and perform the higher priority interrupt process. After executing the higher priority interrupt process the processor will return to executing the lower priority interrupt process, and therafter return to executing the interrupted process.

Figure 2:
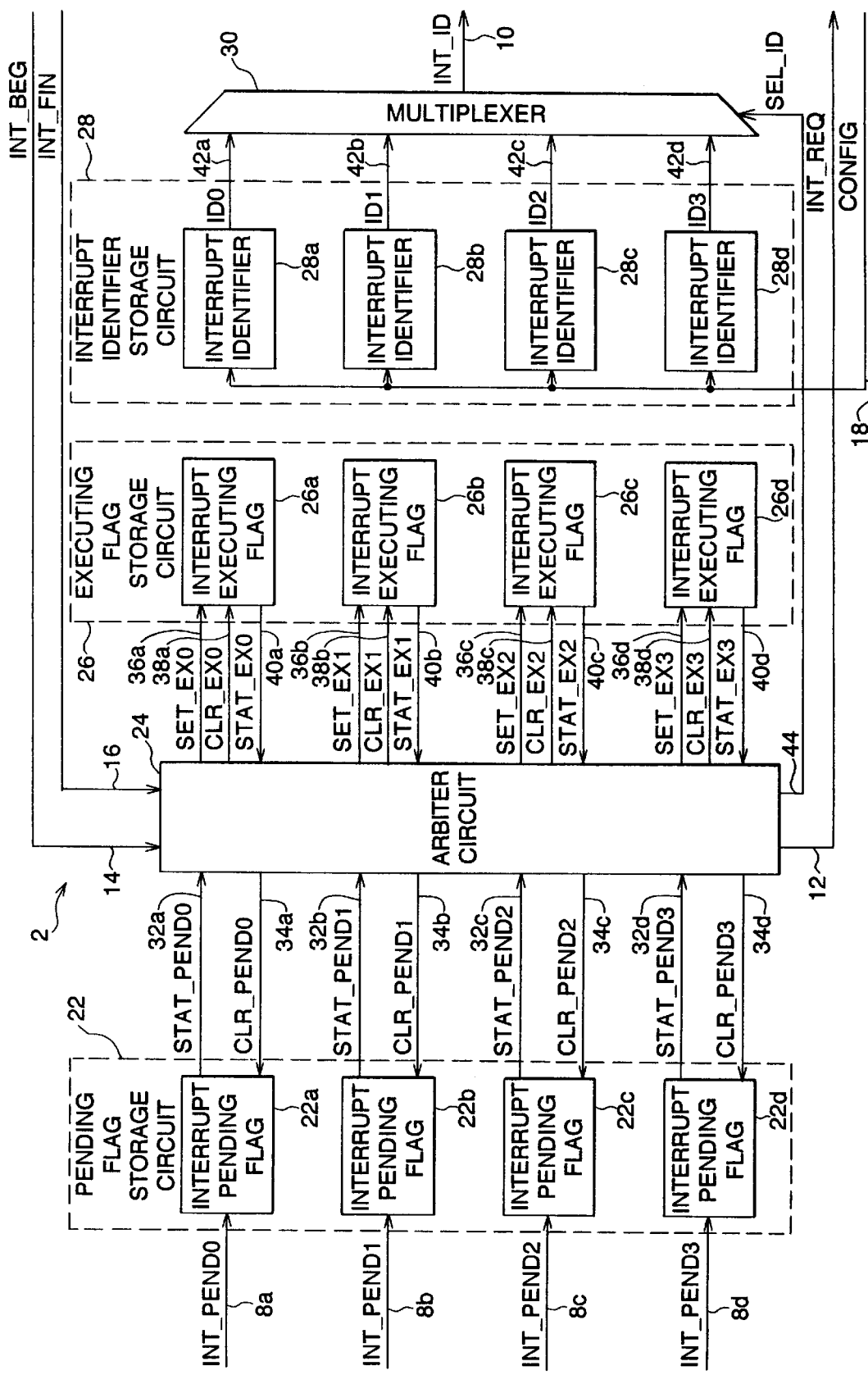
FIG. 2 illustrates a detailed implementation of the interrupt controller of FIG. 1.

The operation of an interrupt controller according to a preferred embodiment of the invention will now be described in detail with reference to FIG. 2, which shows an implementation of the interrupt controller 2 of FIG. 1. In FIG. 2 like numerals have been used to denote like parts of FIG. 1 wherever possible.

The interrupt controller 2 of FIG. 2 comprises a pending flag storage circuit 22 including four interrupt pending flags 22a to 22d, an arbiter circuit 24, an executing flag storage circuit 26 including four interrupt executing flags 26a to 26d, an interrupt identifier storage circuit 28 including four interrupt identifiers 28a to 28d, and a multiplexor 30. Each of the interrupt pending flags 22a to 22d receives a respective one of the interrupt signals INT_PEND0 to INT_PEND3 on lines 8a to 8d and a respective one of four clear interrupt pending signals CLR_PEND0 to CLR_PEND3 on lines 34a to 34d, and outputs four interrupt pending status signals STAT_PEND0 to STAT_PEND3 on lines 32a to 32d. The arbiter circuit 24 receives each of the interrupt pending status signals STAT_PEND0 to STAT_PEND3 and outputs each of the clear interrupt pending signals CLR_PEND0 to CLR_PEND3. The arbiter circuit 24 also receives the signal INT_BEG on line 14 and the signal INT_FIN on line 16 and outputs the signal INT_REQ on line 12. The arbiter circuit 24 further ouputs four set interrupt executing signals SET_EX0 to SET_EX3 to respective ones of the interrupt executing flags 26a to 26d, four clear interrupt executing signals CLR_EX0 to CLR_EX3 to respective ones of the interrupt executing flags 26a to 26d, and a select interrupt identifier signal SEL_ID on line 44 to the multiplexor 30, and receives four interrupt executing status signals STAT_EX0 to STAT_EX3 on lines 40a to 40d from respective ones of the interrupt executing flags 26a to 26d. Each of the four interrupt identifiers 28a to 28d receive the signals CONFIG on line 18, and output a respective identifier signal ID0 to ID3 on lines 42a to 42d to the multiplexor 30. The multiplexor 30 is controlled by the signal SEL_ID to output one of the identifier signals ID0 to ID3 as the interrupt identifier signal INT_ID on line 10.

Each one of the four interrupt pending flags 22a to 22d, the four interrupt executing. flags 26a to 26d, and the four interrupt identifiers 28a to 28d is associated with one of the four interrupt process priority levels.

Prior to operation of the interrupt controller, using the signals CONFIG, the processor loads into each of the interrupt identifiers 28a to 28d of the interrupt identifier storage circuit an identifier associated with each of the four interrupts. This interrupt identifier must be a unique "tag" which the processor can use to identify each particular interrupt. The interrupt identifier may be used to identify an instruction pointer, a pointer to an area of memory for use by the interrupt routine, or an area of memory in which parameters associated with the interrupted process can be stored. In the preferred embodiment the interrupt identifier is an address of main memory which is reserved for use by the interrupt. Each interrupt level has an area of main memory allocated for storage of parameters associated with an interrupted process, for example register contents of the processor associated with the interrupted process, which are essential for returning to the interrupted process. The use of the memory in this way allows extra interrupt levels to be added independently of the processor. The allocation of areas of main memory to interrupt levels will be explained with reference to FIG. 3.

Figure 3:
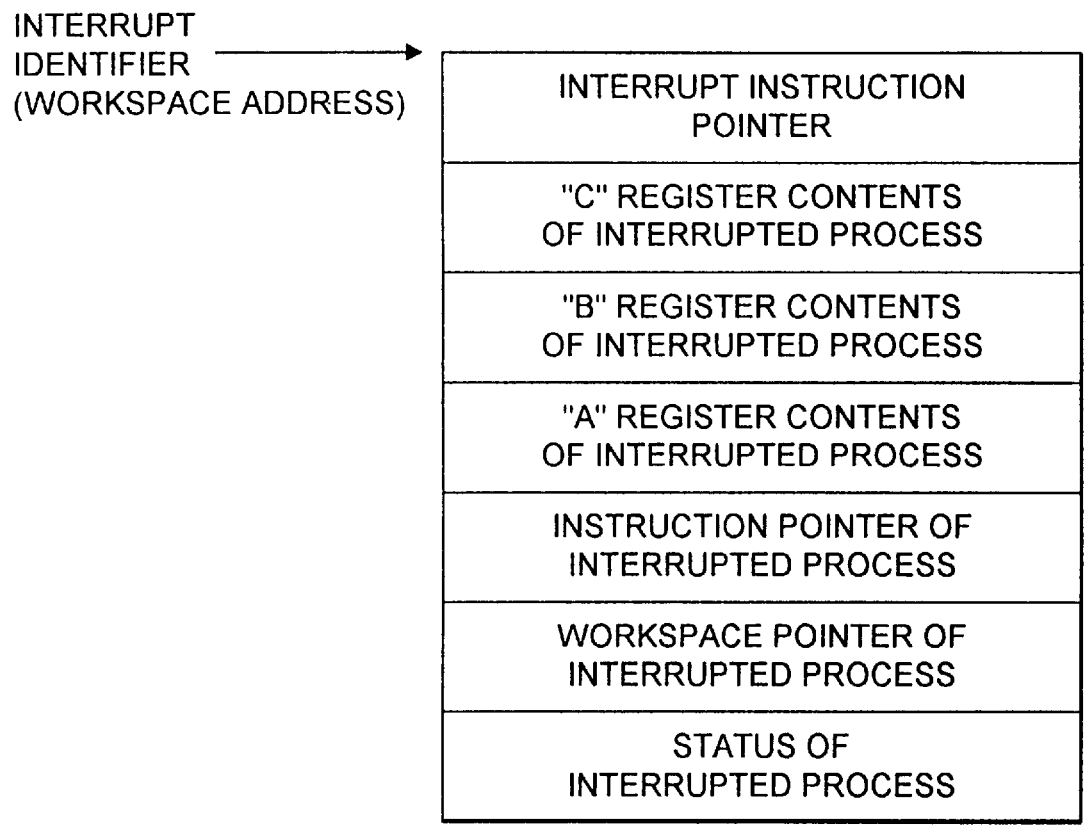
FIG. 3 illustrates a reserved memory space associated with the interrupt controller according to the present invention.

In a preferred embodiment the processor 4 is a transputer, and the interrupt identifier is a workspace address in main memory which is the starting address of a workspace associated with that particular interrupt process. Referring to FIG. 3, stored in a fixed position offset from the workspace address is an interrupt instruction pointer which gives the address in main memory of the first instruction which is associated with that particular interrupt process. Other locations in the interrupt workspace offset from the interrupt process workspace address are used to store information associated with the interrupted process so that the interrupted process can be correctly returned to and executed after the interrupt has been executed. Thus if the processor 2 is a transputer then it is necessary to store the contents of a C register, a B register and an A register at the time of the interrupted process, the instruction pointer of the interrupted process, the workspace pointer of the interrupted process and the status of the interrupted process as shown in FIG. 3.

It should also be noted that as explained hereinabove with reference to FIG. 1, an interrupt process can itself be interrupted by an interrupt process. Thus it is possible that the main process has been interrupted by a level 0 interrupt, the level 0 interrupt has been interrupted by a level 1 interrupt, the level 1 interrupt has been interrupted by a level 2 interrupt, and the level 2 interrupt has been interrupted by a level 3 interrupt. In such a scenario the level 3 interrupt will be executing and upon completion the level 2, 1 and 0 interrupts will be successively executed, providing no other higher priority interrupts are pending, before returning to execution of the main process. Thus it is necessary to provide a reserved workspace area such as is shown in FIG. 3 for each level of interrupt so that the interupted process can always be returned to after completion of any level of interrupt. Thus each interrupt identifier has a unique workspace address and reserved area for storing information associated with the interrupted process. It will be understood, however, that the interrupt identifer could be a different type of identification "tag". In particular the interrupt identifier could merely be the address of the first instruction of the interrupt process. If the processor is a standard CPU rather than a transputer, it will still be necessary to store information associated with the interrupted process before executing an interrupt process.

It is important to note that an interrupt process cannot be interrupted by an interrupt request from an interrupt source having the same priority level, and that an interrupt process must be completed and the interrupted process returned to before commencing execution of another interrupt process of the same priority level. As each interrupt priority level is preferably provided with its own workspace area which provides the identity of the interrupted process, then if another interrupt of the same level was commenced before returning to the lower level interrupt or the main process, the details of the interrupted process in the interrupt workspace would be over-written and it would be impossible to return to the interrupted process. Thus the processor must return to the interrupted process in the same cycle as the last instruction of the interrupt process to prevent such an eventuality. The operation of the interrupt controller 2 of FIG. 2 will now be described in detail. Each of the interrupt sources requesting to be serviced by the processor sets its corresponding interrupt signal INT_PEND0 to INT_PEND3, and this causes the respective ones of the interrupt pending flags 22a to 22d to be set. The arbiter circuit 24 cyclically monitors the status of the four interrupt pending flags 22a to 22d to check if any of them have been set by monitoring the interrupt pending status signals STAT_PEND0 to STAT_PEND3. On detecting that one or more of interrupt pending flags 22a to 22d has been set the arbiter circuit sets the interrupt request signal INT_REQ to the processor 2 and determines which of the interrupt pending flags set has the highest priority. The arbiter circuit then sets the signal SEL_ID to connect the appropriate one of the identifier signals ID1 to ID3 to the interrupt identifier signal INT_ID.

As described hereinbefore with reference to FIG. 1 the processor then interrupts its current process and commences execution of the interrupt process identified by the interrupt identifier signal INT_ID. The processor sets the signal INT_BEG to indicate execution of the interrupt has begun. In response to the signal INT_BEG the arbiter circuit sets the appropriate one of the signals CLR_PEND to CLR_PEND3 to thereby clear the interrupt pending flag associated with the interrupt process now being executed, and also sets the appropriate one of the signals SET_EX0 to SET_EX3 to set the one of the interrupt executing flags 26a to 26d associated with that interrupt now being executed.

The arbiter circuit 24 thereafter continues to monitor the status of the interrupt pending flags 22a to 22d on the interrupt pending status signals STAT_PEND0 to STAT_PEND3, and also monitors the status of the interrupt executing status signals STAT_EX0 to STAT_EX3 thereby to check which of the interrupt executing flags 26a to 26d are set. If an interrupt pending flag is set which is associated with an interrupt process having a higher priority than any currently executing interrupt process, then the currently executing interrupt process is interrupted by the interrupt controller 2 in the same manner as described hereinabove so that the higher priority interrupt process is executed. After executing the higher priority interrupt process the processor will return, under the control of the interrupt controller, to execute either an interrupted interrupt process or a pending interrupt depending on whichever has the higher priority.

The interrupt controller 2 may be provided on a single integrated circuit device with the processor 4 and the memory 6.

Although the interrupt controller according to the present invention has been described hereinabove with reference to a particular embodiment, it will be apparent to one skilled in the art how such an interrupt controller may be adapted for use with a wide variety of processors.

What is claimed is:

1. A microprocessor system comprising a processor and a memory and including control circuitry for multiple priority level interrupt requests to the microprocessor, said control circuitry comprising:

input circuitry having a plurality of parallel inputs for receiving respective interrupt signals and including input storage circuitry to provide an indication of which inputs have received an interrupt signal and to retain said indication until an interrupt process associated with the respective interrupt signal has been completed;

identifier storage circuitry for storing a plurality of interrupt identifiers, each interrupt identifier identifying an interrupt process for execution by the processor and corresponding to a respective one of said interrupt signals;

arbiter circuitry connected to said input storage circuitry for determining a priority status for each interrupt signal for which said indication is held by said input storage circuitry and selecting the one interrupt signal with the highest priority status; and output circuitry, operable only in response to an interrupt signal having a higher priority status than any currently executing interrupt process, and responsive to said arbiter circuitry for outputting to said processor a selected one of said plurality of interrupt identifiers associated with said one of said interrupt signals, wherein said input storage circuitry includes a first store for each input to indicate that the interrupt signal has been received for that input, and a second store for each input to indicate that the interrupt process of that input is currently executing and further comprising further input circuitry for receiving an interrupt commencement signal from the processor indicating the processor has begun execution of the interrupt process, said input circuitry being operably connected to said second store whereby an interrupt executing flag associated with said interrupt process is set by said commencement signal.

2. The microprocessor system according to claim 1 in which said further input circuitry includes an input for receiving a completion signal from the processor indicating the processor has completed execution of the interrupt process, the interrupt executing flag associated with said interrupt process being reset by said completion signal.

3. The microprocessor system according to claim 1 wherein said input storage circuitry is connected to said further input circuitry so that said first store is reset by said commencement signal.

4. The microprocessor system according to claim 1, wherein said output circuitry further comprises multiplexor circuitry connected to an output of the arbiter circuitry, wherein the multiplexor circuitry is controlled to output the selected one of said plurality of interrupt identifiers.

5. The microprocessor system according to claim 1, wherein the plurality of interrupt identifiers are addresses in said memory.

6. A microprocessor system comprising a processor and a memory and including control circuitry for multiple priority level interrupt requests to the microprocessor, said control circuitry comprising:

input circuitry having a plurality of parallel inputs for receiving respective interrupt signals and including input storage circuitry to provide an indication of which inputs have received an interrupt signal and to retain said indication until an interrupt process associated with the respective interrupt signal has been completed;

identifier storage circuitry for storing a plurality of interrupt identifiers, each interrupt identifier identifying an interrupt process for execution by the processor and corresponding to a respective one of said interrupt signals;

arbiter circuitry connected to said input storage circuitry for determining a priority status for each interrupt signal for which said indication is held by said input storage circuitry and selecting the one interrupt signal with the highest priority status; and output circuitry, operable only in response to an interrupt signal having a higher priority status than any currently executing interrupt process, and responsive to said arbiter circuitry for outputting to said processor a selected one of said plurality of interrupt identifiers associated with said one of said interrupt signals, wherein the memory has a plurality of allocated address spaces each associated with a respective one of said interrupt processes, wherein during execution of one of the interrupt processes parameters associated with an interrupted process are stored in one of the allocated address spaces.

7. The microprocessor system according to claim 6, wherein said output circuitry further outputs an interrupt request signal to the microprocessor.

8. The microprocessor system according to claim 6, in which said input storage circuitry includes a first store for each input to indicate that the interrupt signal has been received for that input, and a second store for each input to indicate that the interrupt process of that input is currently executing.

9. The microprocessor system according to claim 8 further comprising input circuitry for receiving an interrupt commencement signal from the processor indicating the processor has begun execution of the interrupt process, said input circuitry being operably connected to said second store whereby an interrupt executing flag associated with said interrupt process is set by said commencement signal.

10. The microprocessor system according to claim 9 in which said further input circuitry includes an input for receiving a completion signal from the processor indicating the processor has completed execution of the interrupt process, the interrupt executing flag associated with said interrupt process being reset by said completion signal.

11. The microprocessor system according to claim 9 wherein said input storage circuitry is connected to said further input circuitry so that said first store is reset by said commencement signal.

12. The microprocessor system according to claim 6, wherein said output circuitry further comprises multiplexor circuitry connected to an output of the arbiter circuitry, wherein the multiplexor circuitry is controlled to output the selected one of said plurality of interrupt identifiers.

13. A microprocessor system comprising a processor and a memory and including control circuitry for multiple priority level interrupt requests to the microprocessor, said control circuitry comprising:

input circuitry having a plurality of parallel inputs for receiving respective interrupt signals and including input storage circuitry to provide an indication of which inputs have received an interrupt signal and to retain said indication until an interrupt process associated with the respective interrupt signal has been completed;

identifier storage circuitry for storing a plurality of interrupt identifiers, each interrupt identifier identifying an interrupt process for execution by the processor and corresponding to a respective one of said interrupt signals;

arbiter circuitry connected to said input storage circuitry for determining a priority status for each interrupt signal for which said indication is held by said input storage circuitry and selecting the one interrupt signal with the highest priority status; and output circuitry operable only in response to an interrupt signal having a higher priority status than any currently executing interrupt process, and responsive to said arbiter circuitry for outputting to said processor a selected one of said plurality of interrupt identifiers associated with said one of said interrupt signals, wherein the processor, the memory and the control circuitry are formed on a single integrated circuit device.

14. A method of controlling multiple priority level interrupt requests in a microprocessor system including a memory and a processor, said method comprising the steps of:

receiving at least one of a plurality of parallel interrupt signals;

storing an indication of which interrupt signals have been received;

retaining said indication until an interrupt process associated with the respective interrupt signal has been completed;

storing a plurality of interrupt identifiers each interrupt identifier identifying an interrupt process for execution by the processor and corresponding to a respective one of said interrupt signals;

determining a priority status for each interrupt signal for which an indication is stored;

selecting the one interrupt signal with the highest priority status;

outputting to said processor, in dependence on an interrupt signal having a higher priority status than any currently executing process, a selected one of said plurality of interrupt identifiers associated with said one interrupt signal;

storing an indication of whether the interrupt process associated with an interrupt signal which has been received is currently executing; and receiving an interrupt commencement signal from the microprocessor indicating the microprocessor has begun commencement of the interrupt process, said indication of whether the interrupt process associated with an interrupt signal which has been received is currently executing being set in response to said interrupt commencement signal.

15. The method according to claim 14 further comprising the step of:

receiving a completion signal from the microprocessor indicating the microprocessor has completed execution of the interrupt process, said indication of whether the interrupt process associated with an interrupt signal which has been received is currently executing being reset in response to said completion signal.

16. The method according to claim 14 wherein the indication of whether an interrupt signal has been received is reset by said interrupt commencement signal.

17. A method of controlling multiple priority level interrupt requests in a microprocessor system including a memory and a processor, said method comprising the steps of:

receiving at least one of a plurality of parallel interrupt signals;

storing an indication of which interrupt signals have been received;

retaining said indication until an interrupt process associated with the respective interrupt signal has been completed;

storing a plurality of interrupt identifiers, each interrupt identifier identifying an interrupt process for execution by the processor and corresponding to a respective one of said interrupt signals;

determining a priority status for each interrupt signal for which an indication is stored;

selecting the one interrupt signal with the highest priority status; and outputting to said processor, in dependence on an interrupt signal having a higher priority status than any currently executing process, a selected one of said plurality of interrupt identifiers associated with said one interrupt signal, further comprising the steps of:

allocating in the memory at least one address space for association with a respective interrupt process up to completion of the interrupt process; and storing in said at least one address space during execution of the interrupt process a parameter associated with a previous process which was interrupted by the interrupt process.

18. The method according to claim 17 further comprising the step of:

storing an indication of whether the interrupt process associated with an interrupt signal which has been received is currently executing.

19. The method according to claim 18 further comprising the step of:

receiving an interrupt commencement signal from the microprocessor indicating the microprocessor has begun commencement of the interrupt process, said indication of whether the interrupt process associated with an interrupt signal which has been received is currently executing being set in response to said interrupt commencement signal.

20. The method according to claim 19 further comprising the step of:

receiving a completion signal from the microprocessor indicating the microprocessor has completed execution of the interrupt process, said indication of whether the interrupt process associated with an interrupt signal which has been received is currently executing being reset in response to said completion signal.

21. The method according to claim 19 wherein the indication of whether an interrupt signal has been received is reset by said interrupt commencement signal.

22. The method according to claim 17 further comprising the step of outputting an interrupt request signal to the microprocessor.

23. The method according to claim 17 wherein after executing an interrupt process the processor immediately returns to continue execution of the interrupted process.

24. The method according to claim 17 in which each executing interrupt process has allocated in memory a respective plurality of address spaces, each plurality of spaces holding parameters of a process which was interrupted by the respective interrupt process.

* * * * *